United States Patent [19]

Herrmann et al.

[11] Patent Number: 4,747,462

[45] Date of Patent: May 31, 1988

[54] FOUR WHEEL DRIVE VEHICLE

[75] Inventors: Hans Herrmann, Gondelsheim; Klaus Hauk, Altrip; Michael Teich, Mannheim, all of Fed. Rep. of Germany

[73] Assignee: Deere and Company, Moline, Ill.

[21] Appl. No.: 902,084

[22] Filed: Aug. 27, 1986

Related U.S. Application Data

[63] Continuation of Ser. No. 734,358, May 14, 1985, abandoned.

[30] Foreign Application Priority Data

May 25, 1984 [EP] European Pat. Off. ........ 84303567.6

[51] Int. Cl.⁴ .............................................. B60K 23/08
[52] U.S. Cl. ...................................... 180/233; 74/856; 180/247; 180/271; 340/57; 340/588
[58] Field of Search ............... 180/233, 247, 271, 279, 180/282, 285, 290, 70.1, 245; 340/57, 52 R, 588, 581; 74/872, 640, 856, 843

[56] References Cited

U.S. PATENT DOCUMENTS

| | | | |
|---|---|---|---|
| 1,168,179 | 1/1916 | Douglas | 180/290 |
| 3,851,723 | 12/1974 | Pagdin | 180/233 |
| 4,078,531 | 3/1978 | Hewitt | 340/57 |
| 4,552,036 | 11/1985 | Tanako | 180/247 |
| 4,556,134 | 12/1985 | Takano | 180/233 |

FOREIGN PATENT DOCUMENTS

| | | | |
|---|---|---|---|
| 17225 | 2/1979 | Japan | 180/290 |
| 80926 | 5/1982 | Japan | 180/247 |
| 71221 | 4/1983 | Japan | 180/247 |
| 56926 | 4/1983 | Japan | 180/247 |
| 101829 | 6/1983 | Japan | 180/233 |
| 2058274 | 4/1981 | United Kingdom | 180/247 |
| 2114252 | 8/1983 | United Kingdom | 180/247 |

Primary Examiner—John J. Love
Assistant Examiner—Everett G. Diederiks, Jr.

[57] ABSTRACT

A mechanical four wheel drive tractor having a solenoid valve which is de-energized to effect engagement of drive to the front wheels in a predetermined operational mode. Normally, the valve is controlled by an operator switch but when the engine is overloaded and exhaust gas temperature rises, a thermal sensor breaks the circuit to the solenoid valve so that four wheel drive is automatically engaged. This action is restricted to a low gear range by a switch linked to the mechanism selecting between the low range and a high range. Restriction to a low gear range prevents unwanted automatic four wheel drive engagement from occuring in other gear ranges without regard to vehicle speed. Automatic engagement of four wheel drive reduces the overload on the transmission.

4 Claims, 1 Drawing Sheet

FOUR WHEEL DRIVE VEHICLE

This application is a continuation of Ser. No. 734,358 filed May 14, 1985 now abandoned.

The present invention relates to a four wheel drive vehicle with drive to a main pair of wheels and selectively engageable drive to a second pair of wheels. The invention is particularly useful for a tractor having main and second pairs of wheels which are normally the rear and front wheels respectively.

BACKGROUND OF THE INVENTION

Many four wheel drive vehicles are equipped with a plurality of range or splitter gears. These range or splitter gears perform a uniform multiplication on all of the speed change gears in the transmission. In industrial or agricultural vehicles, such as tractors, each range gear defines a velocity range that starts at zero and ends at a maximum forward or reverse speed. In addition, four wheel drive engagement for such vehicles is often independent of range gear selection and may be engaged or disengaged at any time.

It is known to monitor operating parameters of a four wheel drive vehicle and automatically engage four wheel drive when it will enhance vehicle operation. Typical operating parameters include wheel slip and transmission overload.

When a tractor is working in hard conditions, e.g. plowing hard ground, there is a risk that the gearbox will be overloaded if the operator fails to respond adequately to the conditions, either through lack of experience or a disposition towards brutal treatment of his vehicle.

SUMMARY OF THE INVENTION

One object of the present invention is to improve the operation of such vehicles by distributing power to all four wheels during an overload condition.

A further object of this invention is to restrict the operation of four wheel drive engagement in order to avoid unwanted or inconvenient four wheel drive engagement.

In its most basic embodiment, the invention provides means for sensing the operation of a four wheel drive vehicle having at least two range gears and in particular, for sensing an overload condition, and control means operative when such a condition is sensed and the vehicle is in predetermined range gears for automatically engaging drive to the second pair of wheels.

The distribution of power to all four wheels reduces the overload on the gearbox and thereby increases the life of this expensive component and reduces the risk of a serious breakdown. This in turn means that the required design life can be achieved with a somewhat lighter and less expensive transmission. The resulting savings in manufacturing costs greatly outweigh the expense of the sensor and control means required to implement the invention.

Limiting the automatic engagement of four wheel drive to a particular range gear selection lets the operator know when automatic four wheel drive cannot occur. Therefor, the operator will not need to monitor operating parameters in anticipation of four wheel drive engagement when outside the range or ranges in which automatic four wheel drive engagement can occur.

The preferred means for sensing an overload condition is a thermal sensor for exhaust gas temperature, which rises rapidly when the engine is overloaded. The sensor may additionally activate an audible alarm when the engine is overloaded and/or moderate the overload by, for example, sending a signal to an electrical fuel injection system to reduce the power developed by the engine. In any event the sensor, whether a thermal sensor or another overload sensor, (e.g. a microphone sensing engine noise) will normally provide an electrical signal to the control means and it is preferred that any break in the sensor circuit shall lead to selection of four wheel drive.

In a more specific embodiment of the invention, the control means is operative for automatically engaging drive to the second pair of wheels only when the lowest of a plurality of ranges is selected. Using the automatic engagement only in low gear offers several advantages.

The invention will be described in more detail with reference to the accompanying drawings.

DESCRIPTION OF THE PREFERRED EMBODIMENT

Figure 1:
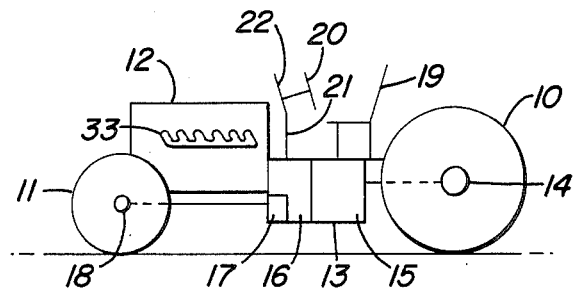
FIG. 1 is a schematic representation of a conventional tractor with mechanical front wheel drive (MFWD)

FIG. 1 is a greatly simplified and schematic representation of an agricultural tractor with rear wheels 10, front wheels 11, an engine 12 and a transmission 13 providing drive to the axle 14 of the rear wheels. The transmission incorporates a change-speed gear box 15 and a range section 16 which can select at least a low gear range I and a high range II. In addition, four wheel drive is provided by selectively engageable means 17 in the transmission providing drive to the axle 18 of the front wheels. The selectively engageable means 17 typically comprises a hydraulically operated clutch controlled by a solenoid valve. These details form no part of the invention and are not described herein since they are well known features commonly incorporated on tractors.

Other conventional features are symbolized by a driver's seat 19, steering wheel 20, and a fireproof engine bulkhead 21 including a dashboard 22. Not shown are the driver controls such as clutch and brake pedals, gear selector levers and a switch for engaging front wheel drive.

Figure 2:
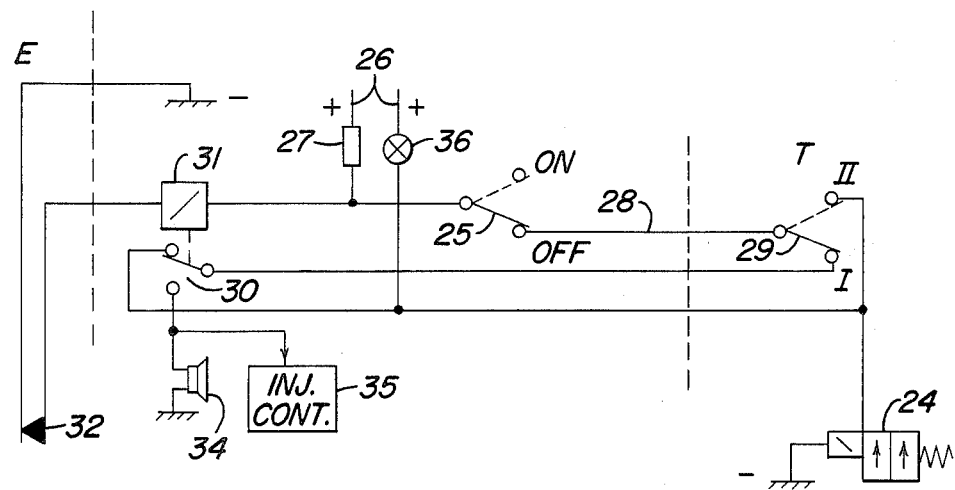
FIG. 2 is a circuit diagram of a control system for use in the tractor in an illustrative embodiment of the invention.

Turning now to FIG. 2, broken vertical lines symbolize the separation between the engine compartment E, the dashboard D and the transmission T. Within the transmission T is the MFWD solenoid valve 24 and for the purposes of the present invention it is merely necessary to note that MFWD is engaged when the valve is de-energized. Energization of the valve disengages MFWD.

On the dashboard is a manually-operable MFWD switch 25 which in the illustrated OFF (disengaged) position connects the battery+terminal 26 through a fuse 27 to a lead 28. In a conventional tractor, the lead 28 would be connected directly to the solenoid valve 24 so that MFWD would be entirely operator-controlled. In practicing the present invention, the lead 28 is connected instead to the common contact of a changeover switch 29 which is controlled by the range gear selector so as to be in position I in gear range I and in position II in gear range II. Switches of this kind are very well known in gearboxes for various purposes.

The switch 29 is shown in position I but when it is in position II it completes the connection of the lead 28 to the MFWD solenoid value 24 so that, in range II, engagement and disengagement of MFWD are controlled exclusively by the operator's MFWD switch 25. In position I, the circuit further includes the contacts 30 of a relay 31 which is normally energized by a circuit completed through normally closed contacts 32 of a thermo-element inserted into a port in the exhaust manifold 33 (FIG. 1) of the engine 12. The contacts 32 open when the engine overheats, say at a temperature above 500° C. The relay will also be de-energized if there is any break in the wiring to its winding.

The relay 31 is shown in its normal *energized* state and the lead 28 is once again connected to the MFWD solenoid valve 24, (via the switch 29 and the contacts 30), and MFWD selection is purely by means of the MFWD switch 25. If the relay 31 is de-energized, the circuit is broken or open and the MFWD solenoid valve 24 is de-energized regardless of the position of the MFWD switch 25.

In the de-energized state of the relay 31, and in position I of switch 29, the contacts 30 energize a buzzer 34 and also provide a signal to the electronic fuel injection control unit 35 for the engine 12. The signal is treated as one of the many inputs to which the unit 35 is responsive and it decreases the amount of fuel injected so as to moderate the overload.

A lamp 36 lights up when MFWD is engaged as the coil of the MFWD solenoid valve 24 provides a sufficiently low impedance path to complete the lamp circuit. When MFWD is disengaged, the lamp has battery + on both terminals and therefore goes out.

As explained, any break in the energizing circuit for the relay 31 results in MFWD being engaged in range I. Breaks in the wiring on the contact side of the relay 31 result in MFWD being engaged permanently (because the solenoid valve 24 is de-energized). As shown, the contacts 32 carry the energizing current for the relay 31 but an electronic relay circuit may be interposed between the contacts 32 and the relay 31.

We claim:

1. A four wheel drive work vehicle having drive to a main pair of wheels and selectively engageable drive to a second pair of wheels, said work vehicle comprising:
   a transmission having a plurality of range gears for range selection and change-speed gears for speed selection within each range;
   means within the drive train of the work vehicle for sensing an overload condition thereof; and
   means for automatically engaging drive to the second pair of wheels when said overload condition is sensed, said automatic engagement means being operable only when the lowest of said plurality of range gears is selected.

2. The work vehicle according to claim 1, further comprising an electronic fuel injection system which acts to reduce the power developed by the engine when said sensing means senses an overload condition.

3. The work vehicle according to claim 1, wherein said sensing means provides a signal to said automatic engagement means via an electrical circuit and said automatic engagement means engages drive to said second pair of wheels when said electrical circuit is open.

4. The work vehicle according to claim 1, wherein said sensing means comprises a thermal sensor for sensing the temperature of the exhaust gas of said engine.

* * * * *